(12) United States Patent
Ruuth et al.

(10) Patent No.: US 6,978,396 B2
(45) Date of Patent: Dec. 20, 2005

(54) METHOD AND SYSTEM FOR PROCESSING REPLICATED TRANSACTIONS PARALLEL IN SECONDARY SERVER

(75) Inventors: Jarmo Ruuth, Espoo (FI); Jarmo Parkkinen, Helsinki (FI); Petri Soini, Vantaa (FI); Antoni Wolski, Kirkkonummi (FI)

(73) Assignee: Solid Information Technology Oy, Helsinki (FI)

( * ) Notice: Subject to any disclaimer, the term of this patent is extended or adjusted under 35 U.S.C. 154(b) by 595 days.

(21) Appl. No.: 10/156,799

(22) Filed: May 30, 2002

(65) Prior Publication Data

US 2003/0225760 A1 Dec. 4, 2003

(51) Int. Cl.[7] .............................................. G06F 11/00
(52) U.S. Cl. ............................. 714/6; 714/16; 707/202
(58) Field of Search ..................... 714/6, 16; 707/202, 707/8

(56) References Cited

U.S. PATENT DOCUMENTS

| | | | |
|---|---|---|---|
| 5,452,445 A * | 9/1995 | Hallmark et al. | 707/2 |
| 5,781,910 A * | 7/1998 | Gostanian et al. | 707/201 |
| 5,799,322 A * | 8/1998 | Mosher, Jr. | 707/202 |
| 5,806,075 A * | 9/1998 | Jain et al. | 707/201 |
| 5,870,761 A * | 2/1999 | Demers et al. | 707/201 |
| 6,065,018 A * | 5/2000 | Beier et al. | 707/202 |
| 6,122,630 A * | 9/2000 | Strickler et al. | 707/8 |
| 6,144,941 A * | 11/2000 | Hotti et al. | 705/4 |
| 6,324,654 B1 * | 11/2001 | Wahl et al. | 714/6 |
| 6,725,242 B2 * | 4/2004 | Gardner | 707/203 |
| 2002/0087501 A1 * | 7/2002 | Breitbart et al. | 707/1 |
| 2002/0116457 A1 * | 8/2002 | Eshleman et al. | 709/203 |
| 2002/0133507 A1 * | 9/2002 | Holenstein et al. | 707/200 |
| 2003/0217119 A1 * | 11/2003 | Raman et al. | 709/219 |

* cited by examiner

*Primary Examiner*—Scott Baderman
*Assistant Examiner*—Paul Contino
(74) *Attorney, Agent, or Firm*—Young & Thompson

(57) ABSTRACT

This invention relates generally to database servers and computer systems and, more particularly, describes the mechanism to run transaction operations originating from a primary server used to replicate data in parallel in a secondary server. Especially the invention relates to running concurrent or parallel operations in a secondary server for redundancy, recovery and propagated transactions. This invention describes how parallel operation in a secondary server improves performance and availability and how it maintains transaction order and output congruent with the primary server where transaction operations are originated.

30 Claims, 11 Drawing Sheets

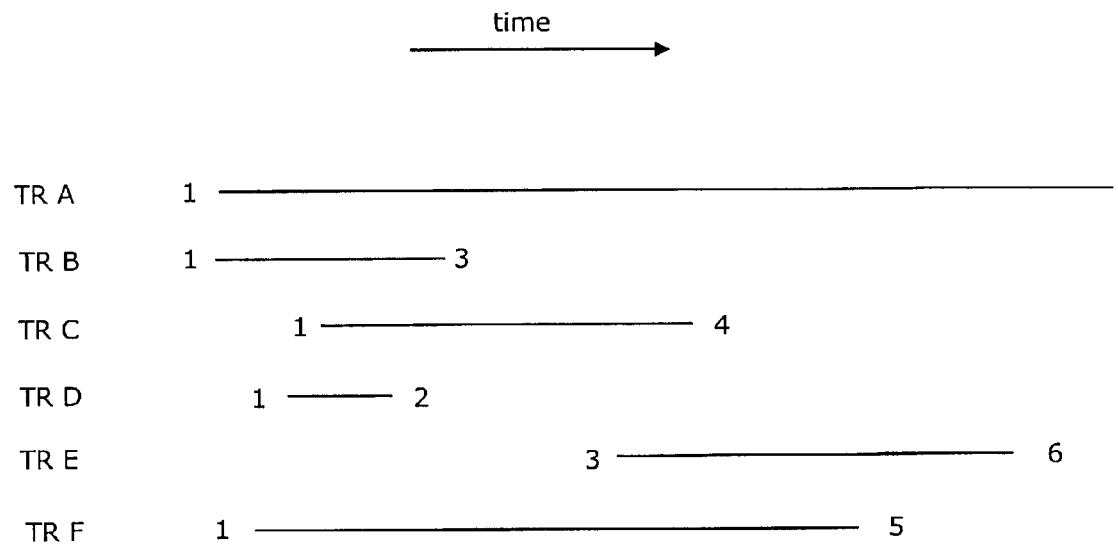
FIG 2a.
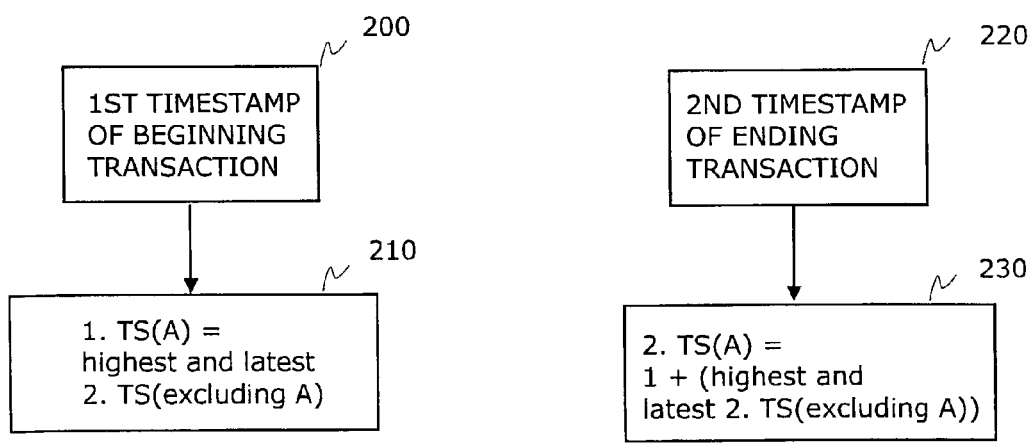
FIG 2b.        FIG 2c.

METHOD AND SYSTEM FOR PROCESSING REPLICATED TRANSACTIONS PARALLEL IN SECONDARY SERVER

TECHNICAL FIELD OF THE INVENTION

The present invention relates generally to database server and computer systems and, more particularly, to run transaction operations in a fault tolerant system originating from a primary server used to replicate data in parallel in a secondary server. Especially the invention relates to running parallel transactions in a secondary server for redundancy or recovery purposes.

BACKGROUND OF THE INVENTION

Various mechanisms are known for replication or recovery of data in a database server system to ensure correct operation in the case of a crash of a system or a failure that causes the system to be out of order for an undefined period of time.

A Hot Standby (HS) is a mechanism which supports non-disruptive failover of database server system maintaining system availability, i.e. its ability to provide desired service when required, by a second server system ready to take over when the main system is unavailable. In the hot standby replication scheme servers usually have two different roles, the first of which is a primary server and the second a secondary (backup, slave) server. The hot standby configuration provides a way for a secondary database to automatically maintain a mirror image of the primary database. The secondary database on the secondary server is usually of read-only type and it is logically identical to the primary database on the primary server. In case a failure occurs in the primary server, the secondary server can take over and assume the role of a new primary server.

There are several methods for achieving high availability in computer systems that contain databases. One known way to carry out continuous hot standby is to mirror the entire system, i.e. databases and the applications that use the database. All operations of the system are performed on both applications of the system. The applications write each transaction to their respective databases so both systems are completely synchronized at all times. To ensure that the applications and their databases are mutually in synchronization, typically a mechanism called application checkpointing is used. After each executed operation, the application ensures by some means that the other application has executed the same operation. In other words, the secondary database in association with the secondary application precisely mirrors the primary database and application. The application level mirroring is a good choice for real-time applications where everything, including the application processes need to be fault tolerant. However, it requires lots of work from the application programmers as the application checkpointing mechanism is a difficult task to implement.

Another method for processing hot standby replication operations is to create a transaction log of the operations of a transaction run in the primary server, transfer the log to the secondary server and run serially the transferred transaction log on the secondary server. This log is a record of all data items that have been inserted, deleted or updated as a result of processing and manipulation of the data within the transaction. The data needs to be written to both databases before it can be committed in either of the databases. This ensures that data is safely stored in the secondary server before the primary server sends acknowledgement of successful commit to the client application. An example of this kind of data mirroring system is described in the U.S. Pat. No. 6,324,654 where "A primary mirror daemon on a local computer system monitors the writelog device (redundant data storage or memory device) for data updates and feeds the data over a network in the same order in which it is stored to a receiving remote mirror daemon on a remote computer system, which in turns commits the data updates to a mirror device." This document is here cited as a reference for prior art [1]. In a situation of a failure recovery these primary and secondary mirror daemons transfer the log to the secondary node where the log is run just as it was in the primary node. The replicated operations are run serially in the secondary node which slows down processing speed and hence reduces overall performance.

Still another mechanism for achieving database fault tolerance is to have an application connect to two databases. Whenever the application executes an application function, it commits the related data changes to both servers. To ensure that the transaction is committed in both databases, the application typically needs to use so called two-phase commit protocol to ensure the success of the transaction in both databases. If the transaction fails in either of the databases, it needs to fail also in the other databases. Using two-phase commit protocol needs to be done in the application which makes the application code more complex. Moreover, distributed transactions are quite common cause to performance problems as the transaction cannot be completed before both databases acknowledge the transaction commit. In this scenario, recovery from error situations can also be very difficult.

Still another way for processing hot standby replication operations is to copy the transaction rows to the secondary node after they have been committed on the primary node. This method is a mere copying procedure where transactions are run serially in the secondary node. This method is known as asynchronous data replication. This method is not always suitable for real-time database mirroring because all transactions of the primary database may not yet be executed in the secondary database when the fail-over from primary to secondary happens.

Many database servers are able to execute concurrent transactions in parallel in an efficient manner. For example, the server may execute different transactions on different processors of a multi-processor computer. This way, the processing power of the database server can be scaled up by adding processors to the computer. Moreover, parallel execution of transactions avoid blocking effect of serially executed long-running transactions such as creating an index to a large table. To ensure integrity of the database, some concurrency control method such as locking or data versioning needs to be used to manage access to data that is shared between transactions. If two transactions try to have write access to the same data item simultaneously and versioning concurrency control is in use, the server either returns a "concurrency conflict" error to one of the transactions and the application needs to re-attempt executing the transaction later. If locking concurrency control is in use, the server makes one of the transactions wait until the locked resources are released. However, in this scenario it is possible that a deadlock condition, where two transactions lock resources from each other, occurs and one of the transactions must be killed to clear the deadlock condition. The application that tried to execute the killed transaction, must handle the error e.g. by re-attempting execution of the transaction.

These concurrency control methods known in the prior art are suitable for use in the primary server of the Hot Standby database configuration to manage concurrent online transactions of client applications but they cannot be applied in the secondary server of the system. This is because the concurrency conflict errors cannot be allowed in the secondary server as there is no way to properly handle these error conditions. Because of the absence of a proper Hot Standby concurrency control method, in the prior art replicated hot standby operations are run substantially in a serial form in the secondary node. Because operations cannot be executed in parallel, it is difficult to improve secondary server's performance without raising problems in data integrity and transaction consistency. Essentially, a mechanism is needed that allows transactions to run parallel but that ensures that transactions are not started too early and they are committed before dependent transactions are started.

SUMMARY OF THE INVENTION

An object of the invention is to provide a method and system for running replicated transactions parallel in a secondary server originating from a primary server. More precisely, the object of the invention is to identify which transactions can be run concurrently in the secondary server without a risk of a concurrency conflict error and the other object is to guarantee that the transaction order and context (output) maintain similar to the transactions of the primary server. For these purposes a set of specific rules are introduced to evaluate which ones of the plurality of transactions can be run parallel securely. The rest of the transactions which don't meet the criteria may end in serial processing. A point of the invention is to improve performance in complex server systems compared to prior art of totally serial transaction approach.

To fulfill the objects of the invention a set of specific rules is determined. The specific rules are defined on basis of a "first timestamp" and "second timestamp" attached to each transaction in the primary server and the rules form a "timestamp criteria". When a transaction meets this timestamp criteria it can be run in parallel with other transactions met the same criteria in the secondary server in accordance with the instructions set in the specific rules to maintain the transaction order and output correct. The use of timestamp criteria as an instrument of parallel transaction executor (PTE) is explained more detail in section Detailed Description.

This invention is used in a database server system comprising a primary server, a secondary server and associated database management system. It is also possible to use this invention having multiple network connections between primary and secondary servers. In multi-node configurations each primary server can have multiple secondary servers.

A preferred embodiment of this invention is to run replicated hot standby (HS) operations and transactions parallel in a secondary server for redundancy. Another embodiment of this invention is to execute transactions parallel from recovery log file after a system crash. Still another embodiment of this invention is to enhance performance of asynchronous data replication process where a batch of transactions that has been executed earlier in one database is to be later executed in another database. This batch of transactions is also known as propagated transactions.

A method for processing on at least one secondary server a plurality of database transactions originating from at least one primary server in a database system comprising steps, in which first and second timestamps of each transaction of a plurality of transactions originating from at least one primary server are evaluated according to specific rules, and in pursuance of the evaluation according to the specific rules the plurality of transactions originating from at least one primary server are run parallel and/or serially on at least one secondary server.

A database system, comprising at least one primary server and at least one secondary server, characterized in that at least one primary or secondary server is arranged to evaluate a first and second timestamp attached to each transaction of the plurality of transactions in the primary server and is arranged to run according to said first and second timestamp transactions parallel and/or serially on at least one secondary server.

The advantage of the invention is to improve speed and performance allowing parallel operations in hot standby, recovery and propagated transactions. High performance is needed in environments where large number of write operations are run each second and parallel processing power of a multi-processing computer is needed to handle the transaction load. Parallel operation according to the invention would not block all hot standby operations in a secondary server in case of executing large operations like creating and index for a large table. Hence, these improvements increase system availability in database server environment.

The best mode of the invention is considered to execute replicated hot standby transactions in the secondary server of a hot standby server pair in a parallel fashion whenever the transactions meet the timestamp-based criteria for parallel execution.

Some embodiments of the invention are described in the dependent claims.

BRIEF DESCRIPTION OF THE DRAWINGS

The foregoing and other objects, features and advantages of this invention will be apparent from the following more particular description of the preferred embodiments of the invention as illustrated in accompanying drawings.

FIG. 2a. shows a transaction scheme in a secondary server on the basis of the specific rules according to the invention.

FIG. 2b. shows a flow diagram of determining the first timestamp of a beginning transaction in the primary server according to the invention.

FIG. 2c. shows a flow diagram of determining the second timestamp of an ending transaction in the primary server according to the invention.

DETAILED DESCRIPTION

The following notions are used in this application:

"Client application" is a software process that connects to another software process such as database server application via a network or other means of inter-process communication and uses services provided by the server application.

"Database server" is an entity, which comprises one or more databases, whereby the server is responsible for reading the data structures contained in the databases and/or data management systems and for changing these data structures.

"Database" is an information structure, which comprises one or more data elements, and the use of which is controlled by the data management system. The invention is applicable both in relational databases and in databases of other forms, such as in object oriented databases.

"Database operation" is an event, during which data elements are read from the database, during which data elements of the database are modified, during which data elements are removed from the database, and/or during which data elements are added to the database. Database operation can also be a call to a stored procedure or other piece of program code that is run by the database server.

"Timestamp" refers to any mechanism which can be used to put events in relative order. The timestamp value can for example be the current time or it can be a value of a global counter object that is incremented whenever an event that requires a timestamp, occurs.

"Transaction" is a plurality of database operations acting on the data elements. A transaction can also comprise further transactions. Typically, transactions implement at least some of the so called ACID (Atomic, Consistent, Isolated and Durable) properties. Atomic property means that a transaction is completed or terminated as a whole. A "commit" operation signifies the successful completion of a transaction and a "rollback" operation signifies the termination of a transaction. The isolation property hides the operations of an ongoing transaction from other users of the database. The consistency property ensures that during a transaction, the application's view to the entire database remains unchanged. Commit makes all operations of the transaction durable and visible to other users. Rollback cancels all operations of the transaction so that no changes to the database are made by the transaction.

Figure 1:
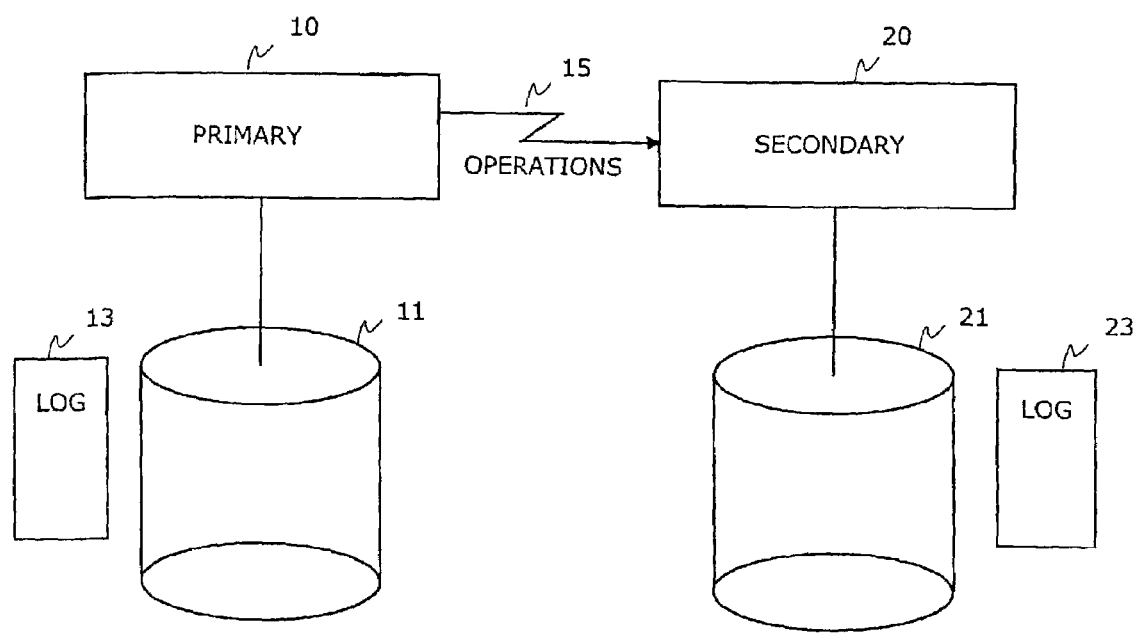
FIG. 1. shows a block diagram of a hot standby replication configuration.

As shown in FIG. 1 in the hot standby replication configuration servers can have two different roles, the first of which is a primary server 10 and the second a secondary (backup, slave) server 20. In association with database server applications are relevant databases, namely a primary database 11 and a secondary database 21. The server applications also control the transaction log files 13, 23. Primary server is the database server to which client applications connect to execute read and write transactions. Secondary server is a database server that communicates with the primary server through at least one network connection or other means of communication and that executes the transactions that primary server sends to it. The server role can be changed from primary to secondary and vice versa by using special commands without shutting down either of the servers. Typically, after a failure in the primary server, the secondary server is instructed to become a new primary. Parallel operations described in this document apply to operations received through the operations arrow 15. Operations include e.g. "insert", "update", "delete" and "transaction commit" operations.

It must be guaranteed that parallel operations and especially transaction commit operations in the secondary server are executed in the same order as in the primary server. It also must be guaranteed that operations in one transaction are always in the same order in the secondary and primary server. Commit operation also requires that all operations of the transaction must be finished before the transaction is committed and next operation in a new transaction is commenced. It also must be guaranteed that transaction does not start before other preceding transactions that may have modified data used by the transaction are committed.

FIG. 2a describes the transaction schedule in the secondary server allowing parallel operation according to the invention. Each transaction (TR A, TR B, TR C, . . . ) has two numbers, one in front and one at the end of transaction. These numbers are assigned to each transaction in the primary server when the transaction is executed there. The numbers are obtained from a global counter variable that the database server maintains. Whenever the server performs a commit operation, the counter value is incremented by a non-zero value. The current value of the counter is also assigned to the rows affected by the commit operation. The number in front of transaction is assigned to the transaction when the first operation of the transaction is executed. This number is called the "read level" of the transaction. In other words, read level is a number given to a transaction to conclude when it was started. In a multi-versioning database engine, the read level indicates, which rows are visible to the queries of the transaction. Only those rows whose version number is lower than the read level of the transaction, may be returned in the result set of the query. The number is proportional to other transactions i.e. the matter in question is a proportional version number.

The number at the end of transaction is called the "commit level" of the transaction, and it signifies the order in which the transaction is committed.

These numbers that are assigned to each transaction in the primary server are used to control parallel transaction processing in the secondary server of the hot standby server pair. The basic rule is that a commencing transaction that has a certain read level may start only after transactions having lower or equal commit levels have ended. As an example of this, according to FIG. 2a transaction TR E with read level 3 cannot commence before transaction TR B that has commit level 3 is ended. Transaction TR C is causing modifications and its commit level is 4, so it is a sign that all modifications affecting transaction TR E of read level 3 have been treated. So, a transaction may only begin when all the data below its read level is "visible" to it, i.e. committed to the database by the other transactions. In FIG. 2a transaction TR A does not have any number at the end visible while running concurrently with other transactions. TR A may include large and long running operations like "create index" operation and it would not block other hot standby operations in the secondary server. It should be noticed that the number line of commit levels is continuously incrementing by a non-zero number, such as one, in course of time when operations are executed in the database. However, if a commit fails the number does not represent any committed transaction. Thus the numbering for committed transactions may contain holes.

FIGS. 2b and 2c describe how a "first timestamp" and "second timestamp" are determined by read and commit levels of transactions in the primary server. As shown in block 200 the first timestamp is related to the commencing transaction and its read level. A first timestamp will be a read level of an incipient transaction and it is determined to be the highest AND latest commit level among other transactions. As shown in block 220 the second timestamp is related to the ending transaction and its commit level. A second timestamp will be the commit level of an ending transaction and it is determined to be the highest AND latest commit number among other transactions incremented by a non-zero number, such as one. In this connection AND means logical AND operand. As shown in block 210 the first timestamp of transaction TR A (1. TS(A)) will be the highest and latest second timestamp in a group of other transactions than TR A. In this TS is the abbreviation of timestamp and TS(excluding A) refers to all other transactions than transaction TR A which is referred by TS(A). Correspondingly, as shown in block 230 the second timestamp of transaction TR A (2. TS(A)) will be the highest and latest second timestamp in a group of other transactions than TR A. Respectively, in this TS is the abbreviation of timestamp and TS(excluding A) refers to all other transactions than transaction TR A which is referred by TS(A). A program object called parallel transaction executor (PTE) has the main role to identify which transactions can be run parallel in the secondary node. PTE can be integrated into a database server application or an application connected to it.

Figure 3:
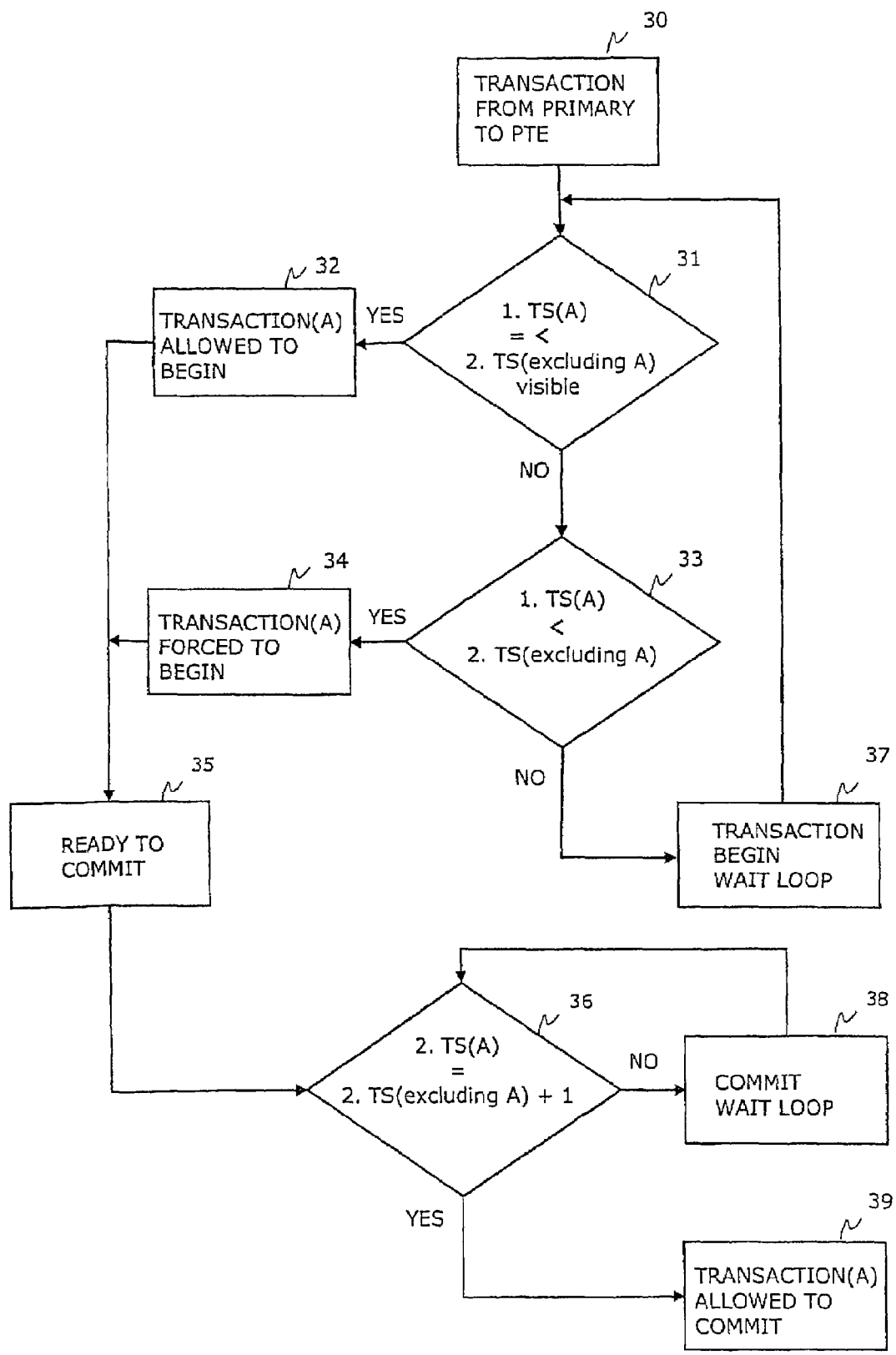
FIG. 3. shows a flow diagram of checking the specific rules (timestamp criteria) for parallel operation in a secondary server according to the invention.

A flow diagram in FIG. 3 shows the method for checking the "timestamp criteria" determined by the special rules depending on the first and second timestamps. This process is done for each transaction transmitted by the primary server to the PTE as shown in step 30. After transactions are transmitted from the primary to the parallel transaction executor PTE the timestamp criteria they have to meet for parallel operation are shown in steps 31, 33 and 36. As a result of passing at least one of the timestamp criteria 31 or 33 and criteria 36, parallel operation in the secondary is executed as shown in step 39. In case of not passing the timestamp criteria said transaction remains in wait state as shown by the wait processing loop in step 37 or in step 38.

Here are used foregoing markings, namely TS is the abbreviation of timestamp, TS(excluding A) refers to timestamps of all other transactions than transaction A (TR A) and timestamps of transaction A are referred by TS(A). In first step 31 it is checked if the first timestamp of the beginning transaction (1. TS(A)) is equal to or less than the highest second timestamp of the committed transaction (2. TS(excluding A)). In other words the transactions can commence when commit level equal to or higher than read level is visible. In case the condition is fulfilled the transaction in question is allowed to begin as shown in step 32. Eventually the transaction will be ready to commit in step 35.

In second step 33 it is checked whether the first timestamp of the beginning transaction (1. TS(A)) is less than the second timestamp of the committed transaction (2. TS(excluding A)). In case of affirmative answer the transaction in question is forced to begin as shown in step 34. This means it is necessary to commence the transactions having lower read level before committing higher commit level. Eventually the transaction will be ready to commit in step 35.

However, if neither condition 31 or 33 is fulfilled, the transaction waits in the loop 37, and begins the evaluation for the criteria 31 and 33 later.

Once the transaction has reached phase 35 and is ready to commit, it will be compared with the third criterion in step 36. In step 36 it is checked whether the second timestamp of the committing transaction (2. TS(A)) is equal to 1+the greatest second timestamp of the committed transaction (2. TS(excluding A)). Here we assume for simplicity that the non-zero increment that is being used is one. In case this is fulfilled the transaction in question is allowed to commit as shown in step 39. If the criterion is not met, the transaction enters a commit wait loop 38 and the criterion is re-evaluated after some time. This means that the transactions can commit when transactions having lower commit level have committed. In other words a time-line of commit levels is continuous and incrementing in numeric order as shown in FIG. 2a.

Figure 4A:
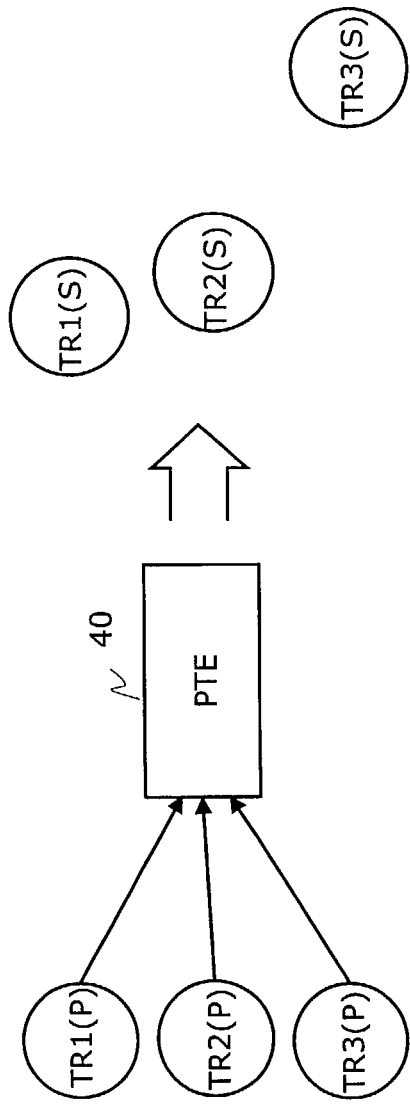
FIG. 4a. shows a block diagram of processing hot standby transactions according to the invention.
Figure 4B:
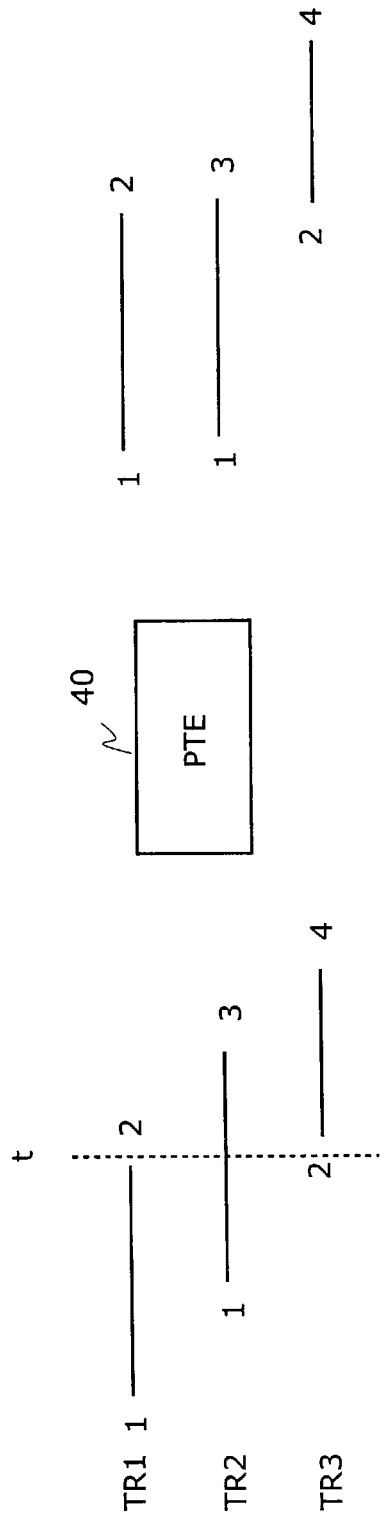
FIG. 4b. shows a transaction scheme of processing hot standby transactions according to the invention.
Figure 4C:
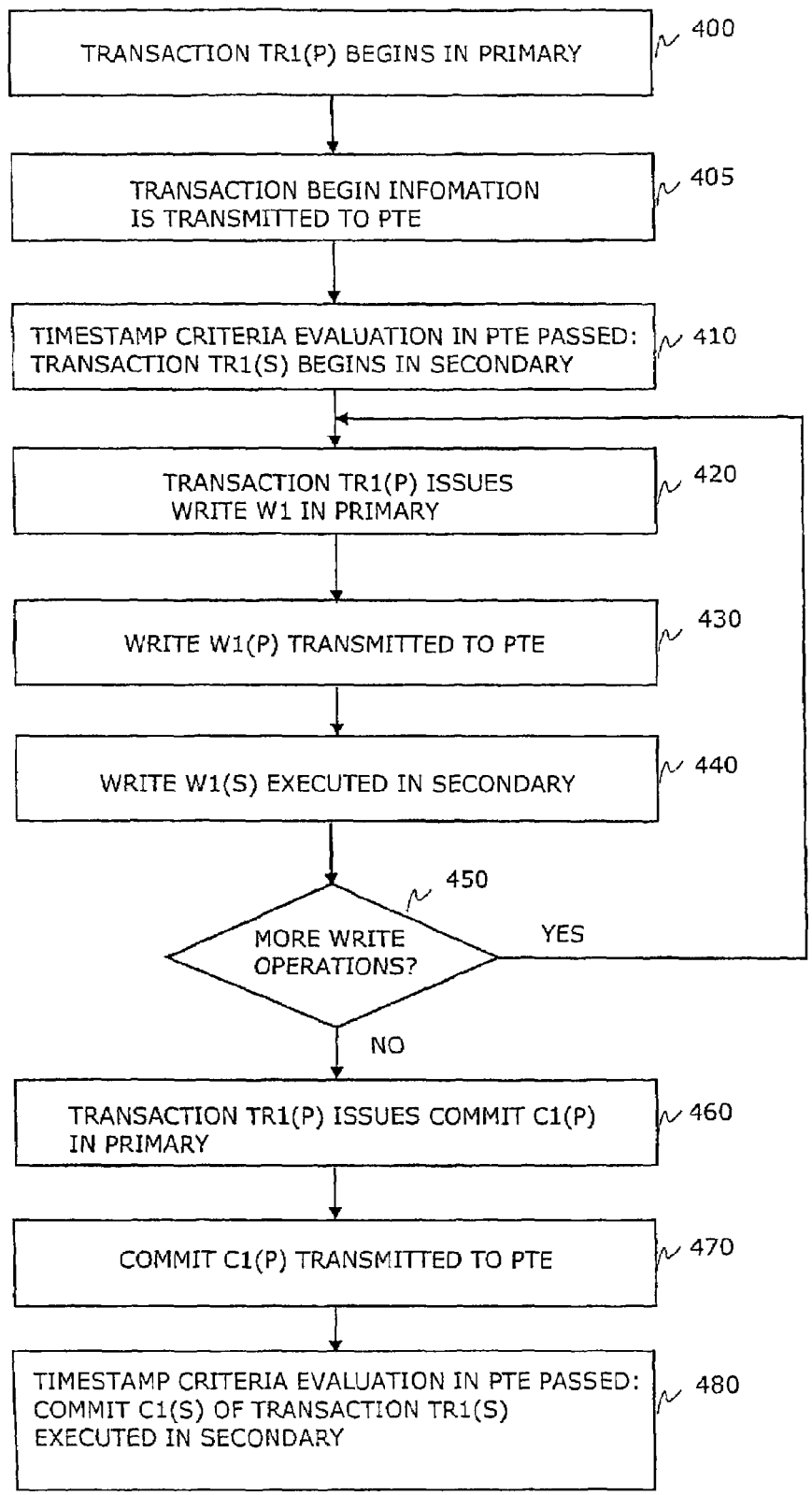
FIG. 4c. shows a flow diagram of a method for processing a hot standby transaction according to the invention.

FIGS. 4a, 4b and 4c illustrate hot standby replication method and system according to one embodiment of the invention. In connection with transactions and operations P in parenthesis means primary server side and S secondary server side. In FIG. 4a transactions TR1(P), TR2(P) and TR3(P) are transmitted from the primary server to the parallel transaction executor (PTE) 40 which centrally handles transactions' propagation to the secondary server. PTE is a piece of software code which receives transactions from the primary server (TR(P)) and transmits them to the secondary server where transactions (TR(S)) are executed according to the timestamp criteria concurrently and/or sequentially as shown in FIG. 4b. FIG. 4b describes the transaction schedule in the primary and secondary server for running hot standby transactions in the secondary server according to the invention. Each transaction of the two groups TR1(P), TR2(P), TR3(P) and TR1(S), TR2(S), TR3(S) has two numbers, one in front (1, 1, 2) and one at the end (2, 3, 4) of transaction which numbers are attached to each transaction in the primary server. These numbers are used to control parallel transaction processing in the secondary server. According to FIG. 4b transactions TR1(S) and TR2(S) are running concurrently in the secondary server because they both have number 1 as read level. Transaction TR1(S) commits first because its commit level is 1+1=2 (this is defined in the primary as shown in box 230 in FIG. 2c). Transaction TR2(S) commits after TR1(S) because its commit level is 1+2=3. Then transaction TR3(S) can commence because its read level is 2 and transaction TR1(S) with commit level 2 is visible. Moreover, TR3(S) must commence before transaction TR2(S) that has commit level 3, commits. This means that when transaction TR2(S) is causing modifications and its commit level 3 is visible, it is a sign that all modifications affecting transactions of read level 2 have been processed.

FIG. 4c illustrates a flow diagram of one embodiment of the invention when running one hot standby transaction in the secondary. In step 400 transaction TR1(P) is beginning in the primary server. In step 405 the transaction begin info is sent to the parallel transaction executor (PTE). In step 410 first timestamp criteria is passed in the PTE and the transaction TR1(S) begins also in the secondary. In step 420 write operation W1(P) is issued in the primary server and in step 430 write operation W1(P) is transmitted from the primary node to the PTE. Write operation W1(S) is executed in the secondary node according to step 440. Steps 420, 430 and 440 are repeated multiple times if there are multiple write operations in one transaction as depicted in step 450. In next step 460 transaction TR1(P) issues commit operation C1(P)

in the primary node and it is transmitted to PTE according to step 470. After this commit operation C1(S) of transaction TR1(S) is executed in the secondary server as depicted in step 480 when the second timestamp criteria evaluation in PTE passes.

In FIG. 4c the parallel transaction executor (PTE) according to the invention applies to steps 410–450, 470 and 480 where concurrent transactions are active. Steps 400–480 can also be executed simultaneously by multiple different sessions if there are concurrent sessions active in the primary server. Each session and steps in each session are executed independently.

FIGS. 5a, 5b, 5c and 5d illustrate a method and system for processing of recovery transactions according to the second embodiment of the invention. During normal mode of operation, the server acts like a primary server. All transactions that the server executes, are stored in a transaction log file for later possible recovery. Every now and then the server also creates a checkpoint that is a known consistent state of the database. When recovering a database from a crash or unsuccessful shutdown, the database server is re-started in a recovery mode that is similar to the role of the secondary server in the first embodiment of the invention. When the database is opened, the database file contains data up to the last successful checkpoint. All data that has been written to the database after the checkpoint, needs to be recovered from the transaction recovery log files. These files contain at least all the committed transactions since the last successful checkpoint. To perform the roll-forward recovery, the database server reads transactions from the log and executes them in the database.

Figure 5A:
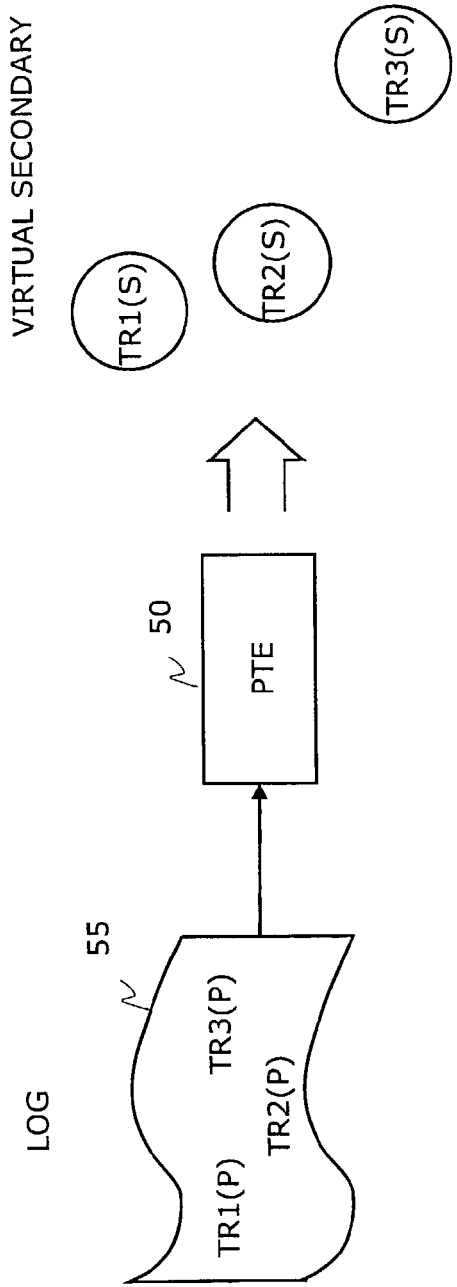
FIG. 5a. shows a block diagram of processing recovery transactions according to the invention.
Figure 5B:
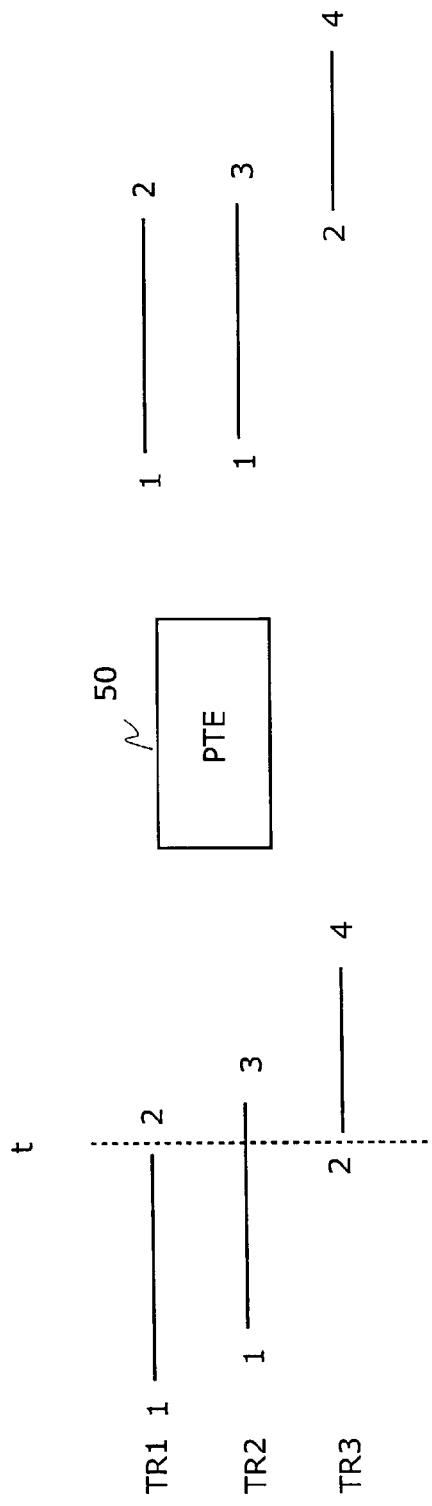
FIG. 5b. shows a transaction scheme of processing recovery transactions according to the invention.

To improve the performance of the roll-forward recovery in a multiprocessor computer, the recovery transactions should advantageously be executed in parallel whenever possible. According to the present invention, parallel execution can be achieved using the Parallel Transaction Executor that reads the transactions from the transaction log file and determines the transaction execution schedule based on the read and commit levels. In connection with transactions and operations P in parenthesis means transactions written to the log file 55 by the server that is operating on normal mode, i.e. in similar manner than primary server operates in the hot standby arrangement. S relates to a server that is operating in the recovery mode in this embodiment, i.e. in similar manner than secondary server operates in the hot standby arrangement. In FIG. 5a transactions TR1(P), TR2(P) and TR3(P), which are written to the recovery log file of the primary server, are transmitted from the transaction log to the parallel transaction executor (PTE) 50. Write and commit operations from different transactions are intermixed in the recovery log. PTE transmits transactions to the recovering server where transactions (TRn(S)) are executed according to the timestamp criteria concurrently and/or sequentially as shown in FIG. 5b.

Figure 5C:
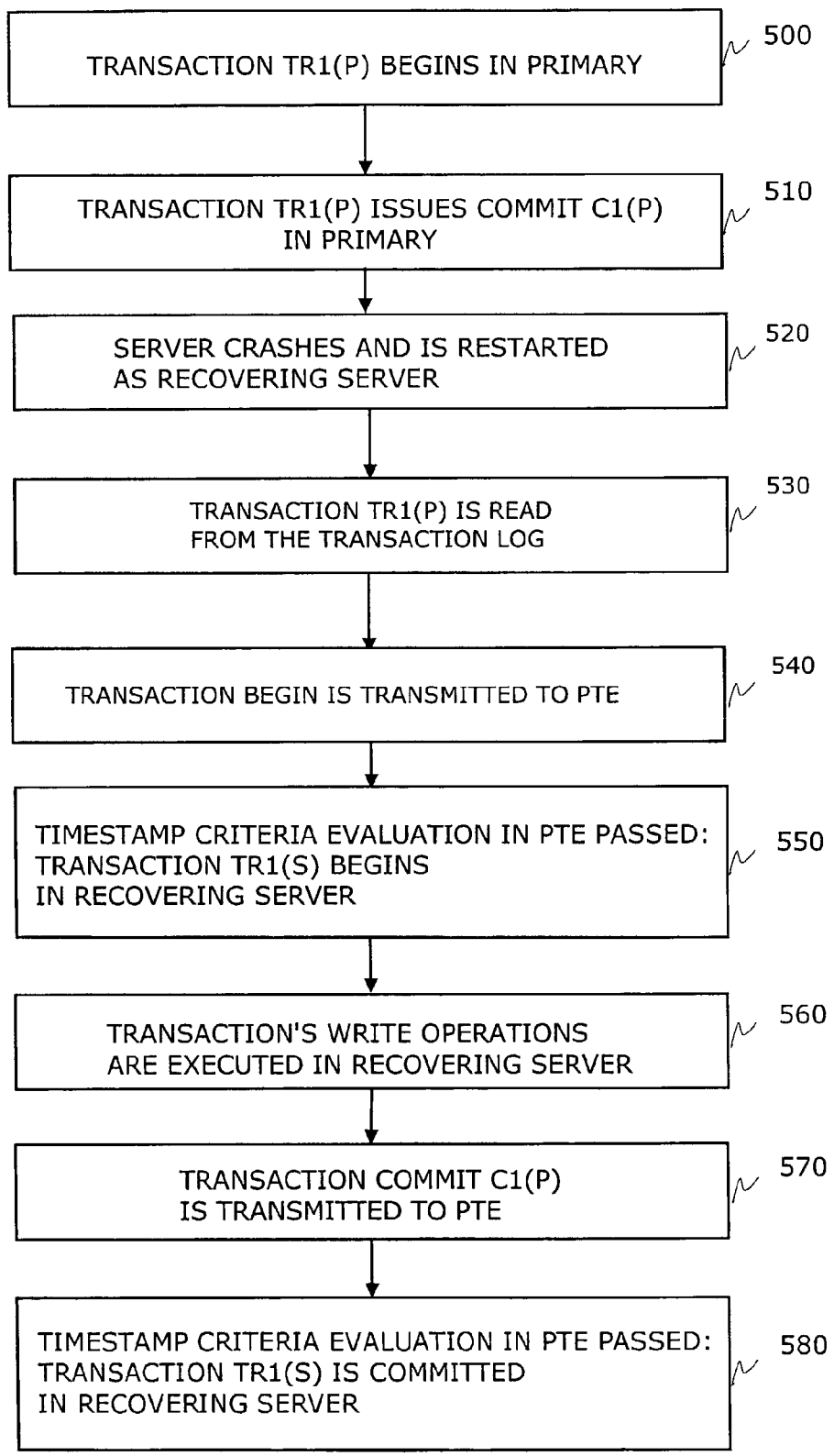
FIG. 5c. shows a flow diagram of a method for processing a recovery transaction according to the invention.

FIG. 5c illustrates a flow diagram of the second embodiment of the invention when writing one transaction to the recovery log file 55. In step 500 transaction TR1(P) is beginning in the server that's operating in the normal mode. In next step 510 transaction TR1(P) issues commit operation C1(P) in the server. After this step, the server is killed and re-started in recovery mode 520. Next in step 530 the transaction is read from the recovery log, its begin information is send to PTE 540 and its timestamps are checked against the timestamp criteria 550: If there are no other recovery transactions that need to commit before the transaction start, transaction TR1(S) begins in the recovering server and write operations W1(S) are executed in the server according to step 560. After this commit operation C1(S) of transaction TR1(S) is read from the transaction log file, transmitted to PTE in step 570 and executed in the recovering server as depicted in step 580 after the second timestamp criteria evaluation passed.

Figure 5D:
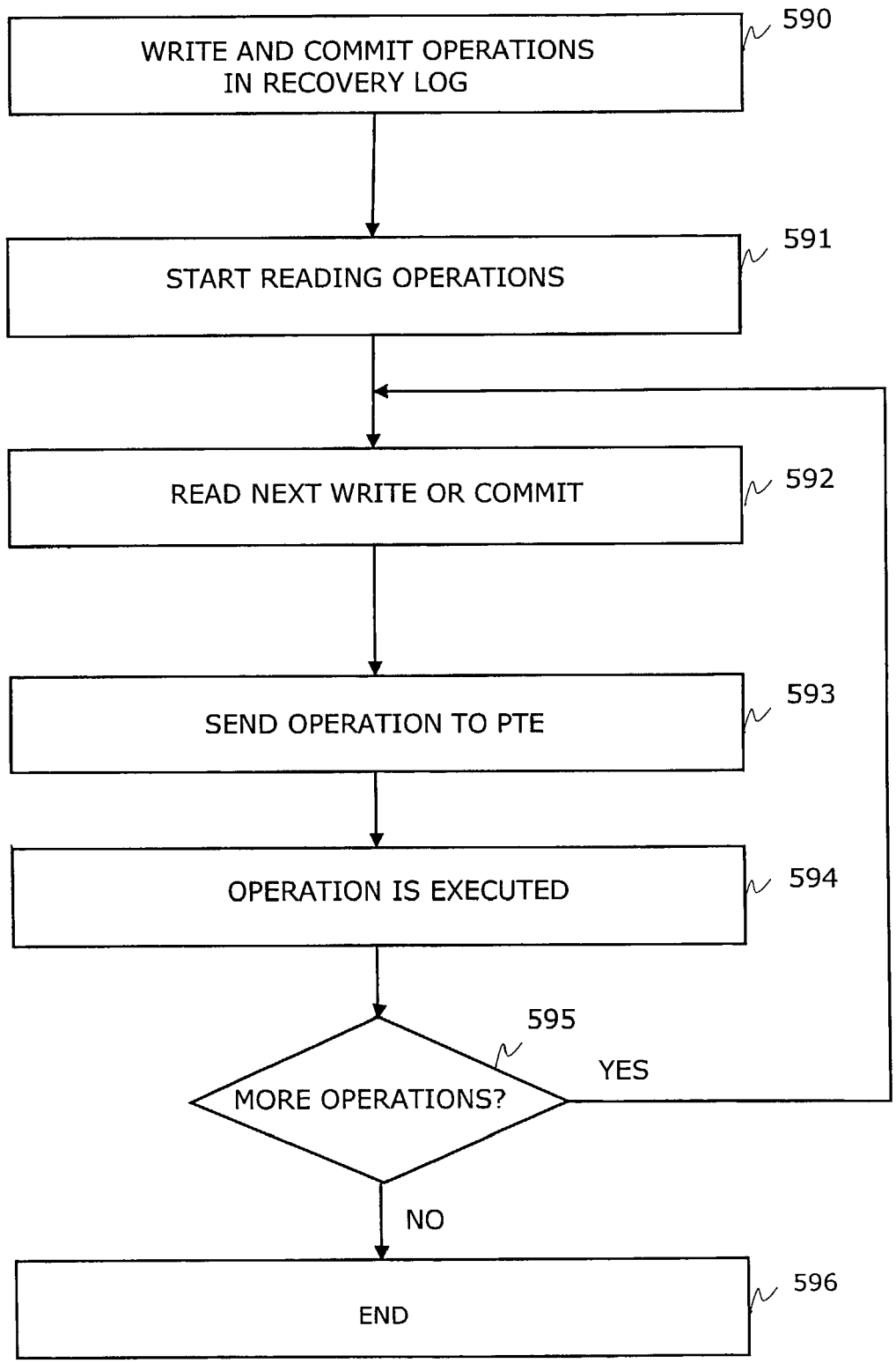
FIG. 5d shows a flow diagram of steps during recovery after a system crash according to the invention.

FIG. 5d shows a flow diagram of steps during recovery after a system crash according to FIG. 5a. In the beginning write and commit operations from different transactions are intermixed in the recovery log file as depicted in step 590. These operations are initiated to be read from the transaction log in step 591. Next write or commit operation is read from the recovery log in step 592 and it is transmitted to the parallel transaction executor (PTE) in step 593. In next step 594 said operation is executed. In case of multiple operations in the recovery log steps 592, 593 and 594 are repeated multiple times as shown in loop step 595.

Figure 6A:
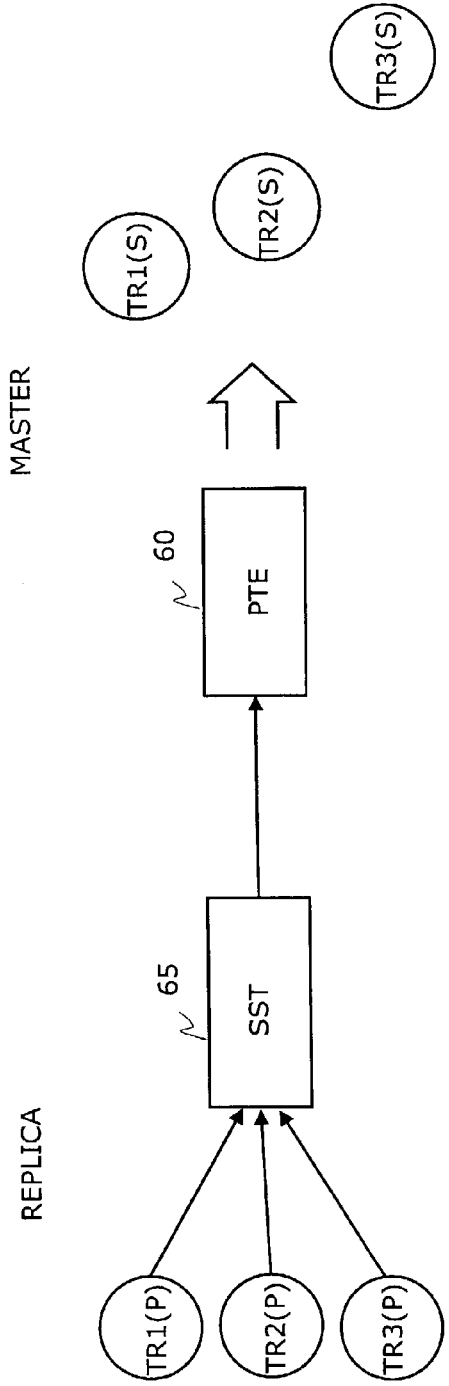
FIG. 6a. shows a block diagram of processing earlier created transactions according to the invention.
Figure 6B:
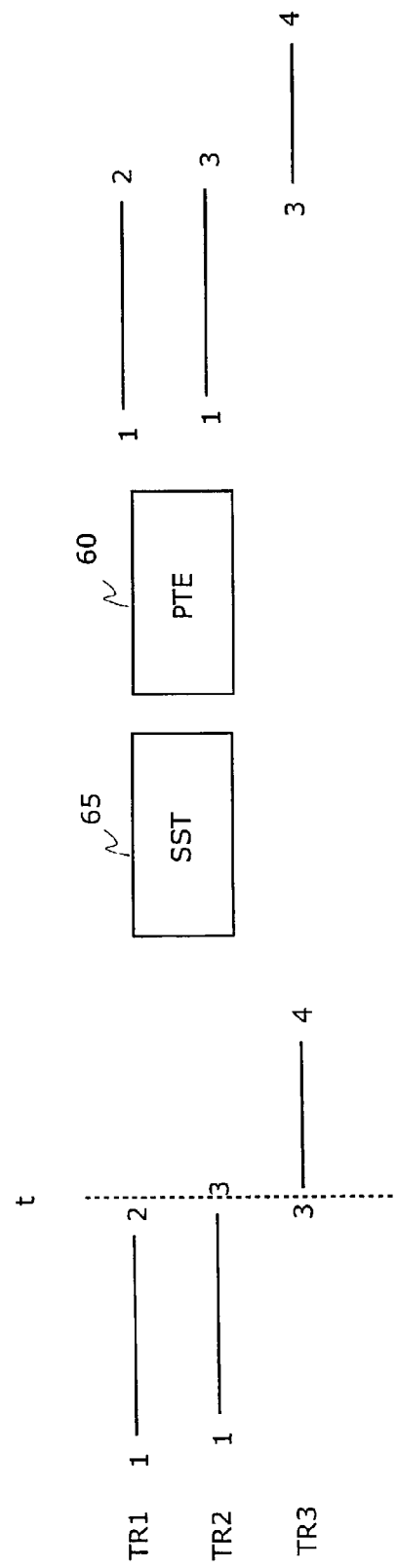
FIG. 6b. shows a transaction scheme of processing earlier created transactions according to the invention.

FIGS. 6a, 6b, 6c and 6d illustrate a method and system for executing a batch of earlier created transactions in a second database according to the third embodiment of the invention. The transactions are created and executed in a first database in which they are also saved to a transaction queue for later, deferred execution in a second database. The transactions may be executed in the second database for example after a period of time has passed or when an application of the first database wants to send the transactions to the second database for example as part of asynchronous data replication process. The transactions of this batch may be for example Intelligent Transactions [2]. In connection with transactions and operations P in parenthesis means primary server side (first database) and S relates to secondary server side (second database) in this embodiment. In FIG. 6a transactions TR1(P), TR2(P) and TR3(P) from the first server are transmitted to the transaction queue that can be for example a saved statements table (SST) 65, where write statements from multiple transactions are stored. From SST transactions are propagated to the parallel transaction executor (PTE) 60 as a batch of transactions. PTE transmits transactions to the second server where transactions (TR(S)) are executed according to the timestamp criteria concurrently and/or sequentially as shown in FIG. 6b. In this embodiment parallel operations are used to execute replicated transactions in the second server in ordinary fashion. According to this embodiment the synchronization process can also proceed in parallel separately when one of the steps 32, 34, 36 illustrated in FIG. 3 (namely 32, 34 or 36 alone) or any combination of them (32&34, 32&36, 34&36, 32&34&36) is met.

Figure 6C:
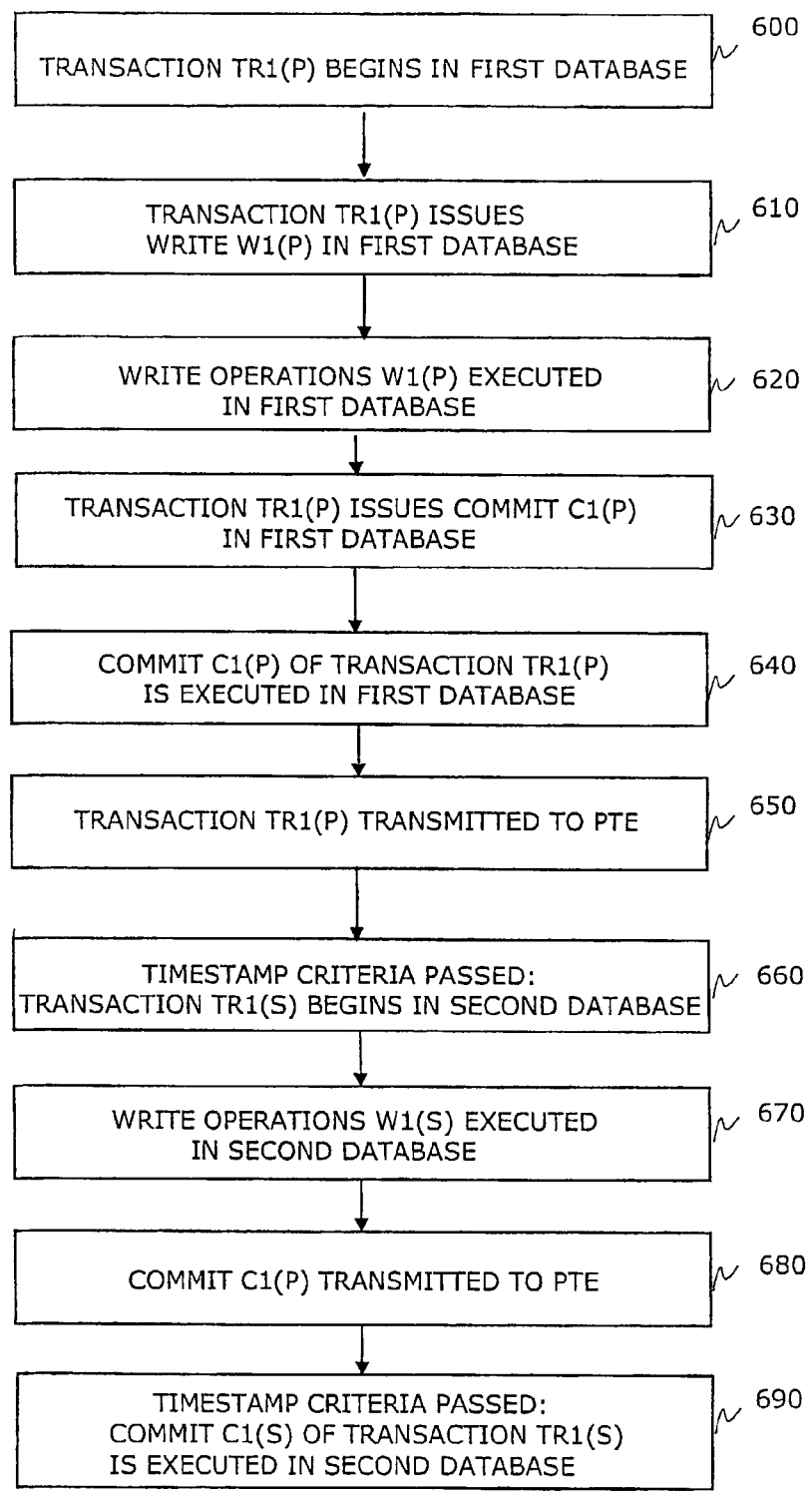
FIG. 6c. shows a flow diagram of a method for processing a earlier created transaction according to the invention.

FIG. 6c illustrates a flow diagram of the third embodiment of the invention when executing a transaction in the second server in a deferred manner. In step 600 transaction TR1(P) begins in the first server. In step 610 transaction TR1(P) issues write operation W1(P) in the first server and in next step 620 write W1(P) is executed in the first server. Step 620 is repeated multiple times if there are multiple write statements in a transaction. The statements are saved in to the transaction queue, implemented here as a saved statements table (SST) which can be understood as a transaction log. In next step 630 transaction TR1(P) issues commit operation C1(P) in the first server. After this commit operation C1(P) of transaction TR1(P) is executed in the first server according to step 640. Then at some later time, transaction TR1W1 (P) is transmitted to PTE according to step 650. Next in step 660 the first timestamp criteria for this transaction is evaluated. If the criteria are met, transaction TR1(S) begins in the second server and write operations W1(S) are executed in the second server according to step 670. In step 680 commit operation C1(P) is transmitted from the first server to the parallel transaction executor (PTE) unless it has been transmitted there earlier, e.g. in the same network message with one or multiple write operations. After this the second timestamp criteria is evaluated. If the criteria are met, commit operation C1(S) of transaction TR1(S) is executed in the second server as depicted in step 690.

Figure 6D:
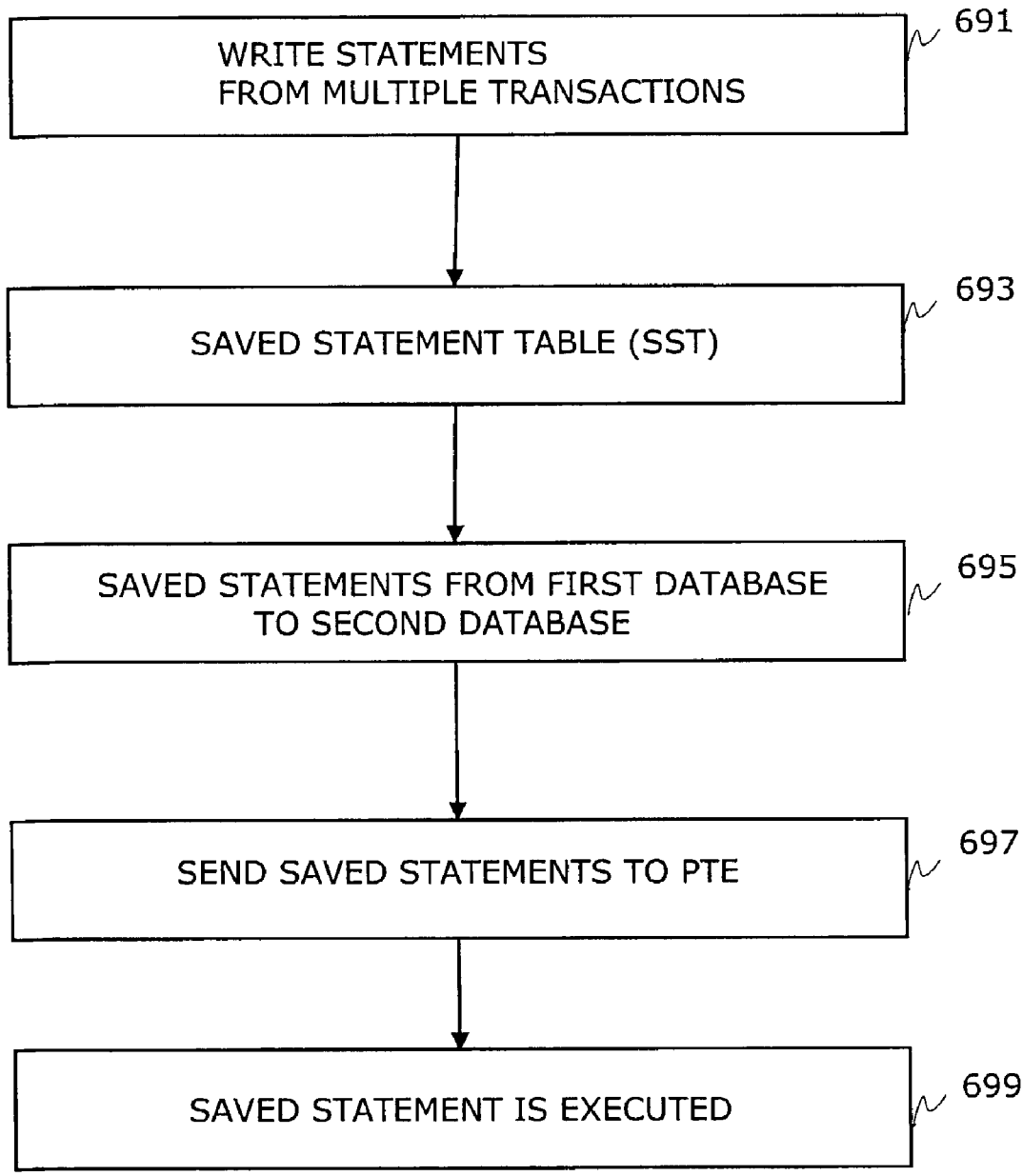
FIG. 6d. shows a flow diagram of processing earlier created transactions according to the invention.

FIG. 6d shows a flow diagram of steps when saved transactions are run in the second server as illustrated in FIG. 6a. Write statements from multiple transactions as shown in step 691 are stored to saved statements table (SST) shown in step 693. Next transactions containing saved statements are propagated from the first server to the second server according to step 695. In next step 697 saved statements are transmitted to the parallel transaction executor (PTE) and in step 699 a saved statement is executed and committed in the second server.

The described method and system of the invention is independent of the communication technology and the client/server or multi-database system. The primary database server and secondary database server can be connected to each other to communicate transactions by any known suitable data transfer system such as cable, wireless, Internet or other communication system or by any combination of these when the connection is established. Parallel transaction executor (PTE) is a program object which is integrated into a database management system (DBMS) or an application using it. The saved statements table (SST) is a table managed by a database management system. The storage medium for SST is a memory or a disk accessed by this DBMS.

The invention is not only limited to transaction scheduling. It is evident that the same inventive idea may be applied in the parallel processing of database rows in a level lower than transactional level.

A system according to the invention can be implemented by a person skilled in the art with state of the art information and communication technology components. A person skilled in the art can implement the functions according to the invention by arranging and programming such components to realize the inventive functions.

For example, it is preferable to implement the invention to work in a telecommunication system which is compliant with, but is not limited to, at least one of the following: TCP/IP, CDMA, GSM, HSCSD, GPRS, WCDMA, EDGE, UMTS, Bluetooth, Teldesic, Iridium, Inmarsat, WLAN, DIGI-TV and imode.

It is also preferable to use a standardized operating system in the terminals and servers. The operating system of a terminal can be, but is not limited to, for example Unix, MS-Windows, EPOC, NT, MSCE, Linux, PalmOS, GEOS, VxWorks, OSE, Solaris, HP-UX, AIX, WinCE, ITRON, QNX and all upgrades of these.

While presently preferred embodiments of the invention have been shown and described in particularity, those skilled in the art will recognize that the invention is not limited to the embodiments described herein. The invention may be otherwise embodied within the spirit and scope of the idea as set forth in the appended claims.

CITED DOCUMENT

[1] U.S. Pat. No. 6,324,654 "Computer Network Remote Data Mirroring System", Legato Systems, Inc.
[2] U.S. Pat. No. 6,144,941 "Intelligent Transaction", Solid Information Technology Oy

What is claimed is:

1. A method for processing on at least one secondary server a plurality of database transactions originating from at least one primary server in a database system, comprising steps, in which
    a first timestamp is attached to each transaction of the plurality of transactions in the primary server in the beginning of the transaction, and
    a second timestamp is attached to each transaction of the plurality of transactions in the primary server at the end of the transaction, wherein
    said second timestamp is a commit level of an ending transaction and it is determined to be the highest AND latest commit level among the plurality of transactions incremented by a non-zero number,
    first and second timestamps of each transaction of a plurality of transactions originating from at least one primary server are evaluated according to specific rules, and
    in pursuance of the evaluation according to the specific rules the plurality of transactions originating from at least one primary server are run parallel and/or serially in at least one secondary server.

2. A method according to claim 1, wherein the plurality of transactions originating from at least one primary seryer are run parallel in at least one secondary server, when at least one of the following conditional steps are valid;
    a transaction is allowed to begin when its first timestamp is equal to or less than the highest second timestamp of committed transactions,
    a transaction having a lower first timestamp is forced to begin before a transaction having a higher second timestamp is committed, and
    a transaction is allowed to commit when all other transactions having lower second timestamps are committed.

3. A method according to claim 1, wherein said first timestamp is a read level of an incipient transaction and it is determined to be the highest AND latest commit level among the plurality of transactions.

4. A method according to claim 1, wherein said first timestamp is a version number of an incipient transaction and it is determined to be the highest AND latest commit level among the plurality of transactions.

5. A method according to claim 2, wherein said transactions comprise replicated hot standby operations.

6. A method according to claim 5, wherein multiple different sessions are executed concurrently in the secondary server when there are concurrent sessions active in a primary server.

7. A method according to claim 6, wherein each session is executed independently.

8. A method according to claim 1, wherein there are multiple network connections between a primary server and a secondary server.

9. A method according to claim 2, wherein said secondary server is a recovering server that recovers transactions written to a recovery log file earlier by a primary server.

10. A method according to claim 9, wherein write and commit operations from different transactions are intermixed in a recovery log file.

11. A method according to claim 9, wherein a recovery after a system crash comprises steps, in which
transaction log file is opened for read access,
next write or commit operation is read from the recovery log file,
said write or commit operation is sent to a parallel transaction executor, and
said operation is executed in the recovering server.

12. A method according to claim 2, wherein a primary server and a secondary server are occasionally connected to each other and said transaction is propagated to the secondary server asynchronously in a batch of transactions.

13. A method according to claim 12, wherein write statements from multiple transactions are saved into a transaction queue.

14. A method according to claim 1, wherein running saved transactions in a secondary server comprises steps, in which
saved transactions are propagated from primary server to secondary server as a batch,
saved statements are sent to a parallel transaction executor, and
saved statement is executed in the secondary server.

15. A method according to claim 1, wherein the method is compatible with at least one of the following communication specifications: TCP/IP, CDMA, GSM, HSCSD, GPRS, WCDMA, EDGE, UMTS, and WLAN.

16. A method according to claim 1, wherein the method is compatible with an operating system and is used in at least one terminal including an application, replica database of a database system.

17. A method according to claim 1, wherein an operating system is used in at least one server including an application master database of a database system.

18. A database system, comprising at least one primary server and at least one secondary server, wherein at least one secondary server is arranged to evaluate a first and second timestamp attached to each transaction of the plurality of transactions in the primary server, said second timestamp is a commit level of an ending transaction and it is determined to be the highest AND latest commit level among the plurality of transactions incremented by a non-zero number and is arranged to run according to said first and second timestamp transactions parallel and/or serially on at least one secondary server.

19. A system according to claim 18, wherein the plurality of transactions originating from at least one primary server are run parallel in at least one secondary server when it is arranged to fulfill all or some of the following conditions;
a transaction is allowed to begin when its first timestamp is equal to or less than the highest second timestamp of a committed transaction,
a transaction having a lower first timestamp is forced to begin before a transaction having a higher second timestamp is committed, and
a transaction is allowed to commit when all other transactions having lower second timestamps are committed.

20. A system according to claim 18, wherein said first timestamp is a read level of an incipient transaction and it is determined to be the highest AND latest commit level among the plurality of transactions.

21. A system according to claim 18, wherein said first timestamp is a version number of an incipient transaction and it is determined to be the highest AND latest commit level among the plurality of transactions.

22. A system according to claim 18, wherein there are multiple network connections between a primary server and a secondary server.

23. A system according to claim 19, wherein said transactions comprise replicated hot standby operations.

24. A system according to claim 19, wherein said secondary server is a recovering server that recovers transactions written to a recovery log file earlier by a primary server.

25. A system according to claim 19, wherein a primary server and a secondary server are occasionally connected to each other and said transaction is propagated to the secondary server asynchronously in a batch of transactions.

26. A system according to claim 19, wherein a program object for parallel transaction execution (PTE) is integrated in a database server or an application program.

27. A system according to claim 25, wherein a storage medium for transaction queue is a memory or a disk.

28. A system according to claim 18, wherein the system is compatible with at least one of the following communication specifications: TCP/IP, CDMA, GSM, HSCSD, GPRS, WCDMA, EDGE, UMTS, and WLAN.

29. A system according to claim 18, wherein the system is compatible with an operating system and is used in at least one terminal including an application, replica database of the database system.

30. A system according to claim 18, wherein an operating system is used in at least one server including an application master database of the database system.

* * * * *